Patented Jan. 15, 1946

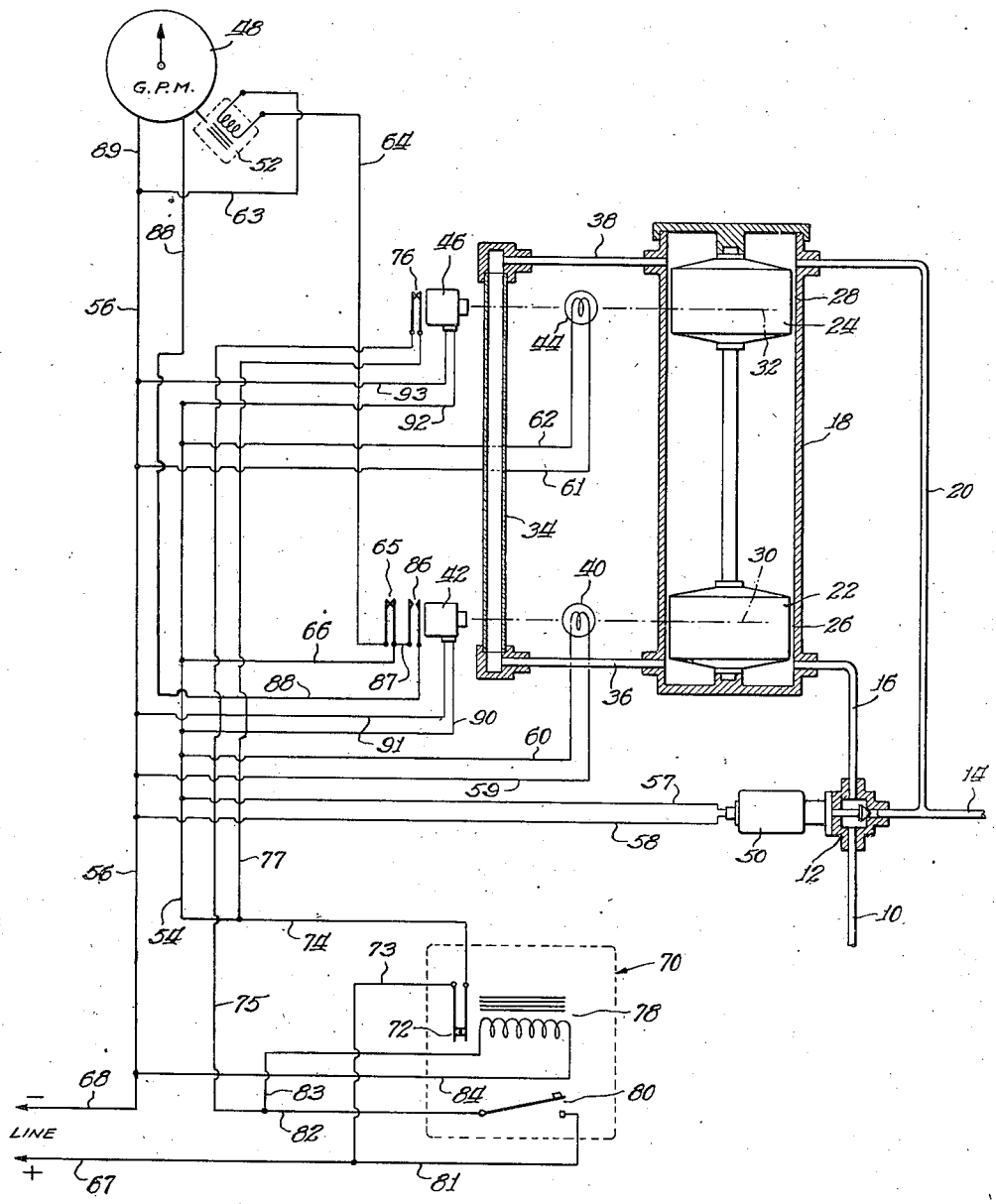

2,392,951

UNITED STATES PATENT OFFICE 2,392,951

FLOWMETER

Roy G. Salisbury, East Cleveland, Ohio, assignor to Pesco Products Co., a corporation of Ohio Application October 14, 1943, Serial No. 506,213

11 Claims. (Cl. 73—223)

This invention relates to flow meters and has as its object to provide an improved mechanism for indicating the length of time required to pass a determined quantity of fluid through a device the capacity of which is to be measured, such for example, as a fluid pump.

More specifically, the invention has as its object to provide an improved flow meter, which is electrically operated and is adapted to automatically complete a full cycle of measuring and indicating operations upon a "push button" start.

A further object of the invention is to provide a flow meter in which extreme accuracy is obtained by employing the body of fluid being measured as a means for successively interrupting a pair of light beams and correspondingly operating a pair of photo-cell switches which in turn control the starting and stopping of the time indicating apparatus.

The invention is particularly adaptable to the measurement of liquid, and contemplates the employment of a column of liquid the heights of which, between the two levels at which the light beams are respectively interrupted, is directly related to the determined quantity of liquid being measured.

Other objects and advantages of the invention will become apparent from a perusal of the following specification taken in connection with the drawing, which shows a schematic layout of a flow measuring apparatus embodying the invention.

Referring now to the drawing in detail, the numeral 10 indicates a fluid line adapted to deliver fluid from the device to be tested, such for example, as a rotary pump of the type employed in aircraft for hydraulically operating the controls thereof. The hydraulic liquid normally utilized by the pump is pumped through the fluid line 10 to a valve 12 which is normally open, and when thus open permits the fluid to bypass through a return line 14 to a suitable reservoir (not shown) from which it is pumped into the line 10. When the valve 12 is closed, the fluid is pumped through a tube 16 into the lower end of an upright tank 18 from the upper end of which the air may bleed through a bleed line 20 into the return line 14. Within the lower and upper regions of the tank 18 are fixed a pair of obstructing cylinders 22 and 24 which are spaced from the lateral wall of the tank by narrow annular passages 26 and 28 respectively. Intercepting the passages 26 and 28 are the cut-off levels indicated by the broken lines 30 and 32 respectively which define between them, within the tank 18, a measured volume. The purpose of the constricted annular passages 26 and 28 is to provide for a relatively rapid rise of the fluid at the cut-off levels 30 and 32 respectively so as to attain a maximum degree of accuracy in the starting and stopping of the timing mechanism in relation to the total period of time occupied in the rise of the liquid from the level 30 to the level 32.

A transparent tube 34 is arranged alongside the tank 18, being connected to the lower end of the tank 18 by a tube 36 and to the upper end of the tank 18 by a tube 38. Arranged at the cut-off level 30 on opposite sides of the tube 34 are a light source 40 and a photo-electric cell 42 respectively and arranged at the level 32 on opposite sides of the tube 34 are a light source 44 and photo-electric cell 46 respectively. The cells 42 and 46 comprise well-known light sensitive relay contact operating devices which are available on the open market. The column of liquid in the tube 34, the height of which corresponds at all times to that of the liquid in the tank 18, is adapted to interrupt the beam of light from the light source 40 to the photo-cell 42 in order to start a timing period during which the length of time required for the liquid to fill the tank 18 from the level 30 to the level 32 is measured and indicated, and when the level 32 is reached, to interrupt the light beam from the light source 44 to the photo-cell 46 in order to terminate the timing period.

The time period is measured and indicated by an electric clock 48 which is adapted to be started when the liquid reaches the level 30 and to be stopped when the liquid reaches the level 32, with the indicating pointer fixed in the position at which the stopping occurs, so as to indicate the time period.

The valve 12 is operated by a solenoid 50. Energization of the solenoid closes the valve 12 to the return line 14, causing the liquid to start rising in the tube 16. Simultaneously with the closing of the valve 12, the clock 48 is reset to zero by a reset solenoid 52. The beginning of a test cycle is attended by the simultaneous energization of the solenoids 50 and 52, and in addition the two light sources 40 and 44. To attain this result, the two solenoids and the two light sources are connected, in parallel, to a pair of electric trunk lines 54 and 56 respectively, the solenoid 50 and the light sources 40 and 44 respectively being directly connected to the trunk lines by respective pairs of lead wires 57, 58, 59, 60, 61 and 62, while the solenoid 52 is connected on one side to the line 56 by a lead wire 63 and on the other side by a lead wire 64, a cut-off switch 65, and a lead wire 66.

The switch 65 will open when the light beam from the light 40 to the photo-cell 42 is interrupted by the rise of the liquid to the level 30, thus deenergizing the reset solenoid 52 at this stage of operation.

The circuit which controls the operation of the timing mechanism of the clock 48 remains open until the light beam from the light source 40 to the photo-cell 42 is interrupted by the rise of the liquid to the level 30. This circuit includes a switch 86, spring-biased toward closed position, opened by the photo-cell 42 when the light beam from the light source 40 to the photo-cell 42 is established at the beginning of the cycle of operation, and again closed when this light beam is interrupted by the rising of the liquid to the level 30. One side of the switch 86 is connected by a conductor 87 and the conductor 66 to the trunk line 54, while the other side of the switch 86 is connected by a wire 88 to one side of the timing mechanism of the clock 48. The other side of the timing mechanism is connected by a wire 89 to the trunk line 56.

The trunk lines 54 and 56 are adapted to be connected to a power line 67, 68 by a main switch mechanism indicated generally at 70. The main switch mechanism 70 includes a main switch proper 72 which is adapted to establish a connection, through conductor 73 to power line 67 and, through conductor 74, to the trunk line 54, the trunk line 56 being connected directly to the power line 68. The main switch 72 will when closed, maintain energizing circuits through the solenoids 50 and 52 and the light sources 40 and 44, subject to the cutting out of the solenoid 52 by opening of its cutout switch 65. The main switch 72 is closed and held in closed position by a conventional relay magnet 78 which is initially energized by a circuit including a starting button 80, a conductor 81 connecting one side of the button 80 to the power line 67, a conductor 82 connecting the other side of the button to a lead 83 connected to one side of the relay magnet 78, and a lead 84 connecting the other side of the magnet 78 to the power line 68. Energization of the holding coil 78 by the circuit just described results in the initial closing of the main switch 72 so as to energize the solenoids 50 and 52 and the lights 40 and 44 as previously described. At this point it may be noted that the cutout switch 65 for the clock reset solenoid 52 is spring-biased toward open position but is closed as soon as the light ray from the light source 40 impinges upon the photo-cell 42, so that energization of the solenoid 52 will occur substantially simultaneously with that of the solenoid 50 and the lights 40 and 44.

Once the main switch 72 has been closed, it will be held closed by the relay magnet 78 through a holding circuit including the power line 67, the conductor 73, the conductor 74, a conductor 77, main cutout switch 76, a conductor 75, the lead 83, the lead 84, and the power line 68. The main switch 76 is spring-biased toward open position and is closed by the energization of the photo-cell 46 from the light source 44. Accordingly, when the liquid in the tank 18 reaches the level 32, interrupting the light beam to the photo-cell 46, the switch 76 will open, interrupting the holding circuit to the relay magnet 78 and causing the main switch 72 to open. In this connection it may be noted that the switch 80 is a conventional push-button type, being self-opening, is held closed by the operator while the various circuits described above are established, and is then released so as to be standing in an open position when the holding circuit is deenergized.

The photo-cell 42 is energized from the trunk lines 54 and 56 through wires 90 and 91 and the photo-cell 46 is energized from the trunk lines 54 and 56 by wires 92 and 93. These circuits are established simultaneously with the circuits to the solenoids 50 and 52 and the light sources 40 and 44. Switches 65, 76 and 86 are portions of the light sensitive relay contact operating devices that include photo-electric cells 42 and 46.

The operation of the system is as follows:

The device to be tested is attached to the fluid line 10 and is operated to pump fluid through the line 10 to the valve 12. Prior to the beginning of the cycle of testing operations, the fluid will pass through the open valve 12 to the return line 14 and then back to the reservoir from which it has been pumped.

The cycle of testing operations is initiated by the operator pressing the push button 80 to effect the closing of the main switch 72 by the energization of the starting circuit from the power line 67, 68 through the conductors 81, 82, 83 and 84.

The closing of the main switch 72 establishes a trunk circuit from the power line 67, 68 through the conductors 73, 74 to the trunk lines 54 and 56. From the trunk lines 54 and 56 the following parallel circuits are established: (a) through wire 57, valve solenoid 50 and wire 58; (b) through wire 59 light source 40 and wire 60; (c) through wire 61, light source 44 and wire 62; (d) through wire 90, photo-cell 42 and wire 91; (e) through wire 92, photo-cell 46 and wire 93.

The energization of photo-cells 42 and 46 closes the self-opening switches 65 and 76 and establishes the following additional circuits: (f) through the wire 66, switch 65, wire 64, solenoid 52 and wire 63; and (g) from the trunk wire 67 through the wire 73, main switch 72, wire 74, wire 77, main cutout switch 76, wire 75, wire 83, holding coil 78, and wire 84 to trunk wire 68.

The closing of the circuit for the valve solenoid 50 causes the valve 12 to close, diverting the flow to the tank 18 through the tube 16. The simultaneous closing of the circuit to the resetting solenoid 52 will cause the latter to reset the indicator pointer on the clock 48 back to its zero position. The timing mechanism control switch 86 is opened by the energization of the photo-cell 42, so that the timing mechanism is inoperative in the initial stage of the testing cycle.

The fluid will rise in the tank 18 and tube 34 while within the range determined by the lower and upper limits of the constricted annular passage 26 in the tank 18, and when it reaches the level 30, will interrupt the light beam from the light source 40 to the photo-cell 42, causing the reset control switch 65 to open and the timing control switch mechanism 86 to close. The relatively rapid rise of the fluid at this stage produces a relatively sharp cutoff of the light beams thus to insure a fairly definite timing of the deenergization of the photo-cell 42 with reference to the total period of rise of the liquid in the tank 18.

The opening of the control switch 65 deenergizes the reset solenoid 52. The closing of the timing control switch 86 starts the operation of the timing mechanism. This operation continues while the liquid rises in the tank 18 to the level 32.

When the liquid reaches the level 32 in the tank 18 and tube 34, the light beam from the light source 44 to the photo-cell 46 is interrupted, causing the main cutoff switch 76 to open, deenergizing the relay magnet 78 and thereby causing the main switch 72 to open. Thus the main circuit to the trunk wires 54 and 56 is interrupted, deenergizing all of the circuits including the circuit to the valve solenoid 50 and the circuit to the timing mechanism of the clock 48. Thus the running of the timing mechanism is interrupted at the exact instant that the liquid reaches the level 32, and the valve 12 is opened so as to permit the fluid to be bypassed through the line 14 from the line 10, and also to permit the fluid to drain from the tank 18 through the return line 14.

Since all circuits have now been deenergized, the receding level of the liquid in the tube 34 will have no effect on any of the circuits.

The liquid is permitted to drain entirely from the tank and tube 34 before another cycle of operations is commenced.

While I have described my invention in connection with one specific embodiment thereof, it is to be understood that this is by way of illustration and not by way of limitation, and the scope of my invention is defined solely by the appended claims.

I claim:

1. In a flow meter, a pair of spaced photo-electric cells, a pair of spaced light sources for producing light beams adapted to impinge upon said photo-electric cells, a transparent tube intersecting the paths of said light beams, a tank providing a space in which a measured volume of fluid may be collected, said tank communicating with the respective extremities of said tube so that the fluid may progress in both the tube and the tank simultaneously, timing mechanism, means controlled by the deenergization of one of said photo-electric cells for starting the timing period of said timing mechanism, and means controlled by the deenergization of the second cell for stopping said timing period, the column of fluid in said tube being adapted to successively interrupt said light beams so as to successively effect the starting and stopping of said timing mechanism.

2. A flow meter as defined in claim 1, wherein said tank is provided with means for producing an accelerated flow of the fluid therein in the regions wherein said light beams are respectively arrested.

3. A flow meter as defined in claim 1, including means for directing a flow of fluid to said tank and tube, a valve adapted when closed to direct the fluid to the tank and tube from said means, a return line adapted, when the valve is open, to permit the fluid to bypass from said directing means around said tank and tube, and control means for simultaneously closing said valve and energizing said light sources and photo-electric cells.

4. A flow meter as defined in claim 1, including a bleed tube for bleeding the air from the upper end of the tank and tube as the fluid level rises therein.

5. In a flow meter, a pair of vertically spaced photo-electric cells, means for providing a pair of light beams adapted to impinge upon the respective cells, means providing a transparent fluid passage intersecting the respective light beams, means including a solenoid-operated valve adapted to direct a flow of fluid to said passage, timing mechanism including time measuring apparatus and means for resetting said time measuring apparatus to zero, a source of electrical energy, a main control switch adapted when closed to direct energy from said source simultaneously to said solenoid, said light beam providing means, said cells and said resetting mechanism, electromagnetic means for closing said main switch and holding the same closed as long as the circuit therethrough is uninterrupted, a starting switch for initially energizing said electromagnetic means for establishing said circuit, a pair of switches controlled by the lower photo-electric cell, one of which is adapted to deenergize the reset mechanism and the other of which is adapted to energize the time measuring apparatus when the lower light beam is interrupted by the rise of fluid in said passage, and a main cutoff switch controlled by the upper photo-electric cell, adapted when the upper light beam is arrested by the rise of said liquid, to open the circuit to said electromagnetic main switch closing means and thereby to open all circuits.

6. A flow meter as defined in claim 5, wherein said time measuring mechanism includes an indicating pointer adapted to remain arrested at the position reached thereby upon the actuation of said main control switch whereby to indicate time period occupied in the flow of said liquid between the two levels of the respective light means.

7. A flow meter as defined in claim 5, including a tank communicating with said transparent passage and providing a main volume of space for accumulating the body of liquid the flow of which is measured, said tank having means providing restricted passages for the flow of fluid at the levels of said light beams so as to accelerate the flow at those levels and thereby sharpen the action in cutting off said light means.

8. A flow meter as defined in claim 5, including a return line to which the fluid may be bypassed around said passage when said valve is open, and a bleed line connecting the upper region of said passage to said return line.

9. In a flow meter, a vertically disposed tube adapted to have a column of fluid advanced therethrough past a first position and subsequently past a second position spaced vertically above said first named position, a pair of photo-electric cell means one located adjacent each of said positions, a pair of correspondingly spaced light beam producing means effective to direct light beams through said tube upon said photo-electric cell means at said respective positions, means for effecting the flow of fluid vertically in said tube including a solenoid responsive valve, timing mechanism for indicating the time consumed between the interruption of said light beam at said first position and the subsequent interruption of said other light beam at said second position by said advancing fluid, means controlled by said cell means for controlling said timing mechanism, means for effecting the return of said timing mechanism to the initial starting position thereof following a previous operation thereof, selectively operable control mechanism effective to simultaneously cause the operation of said solenoid responsive valve to cause the advance of liquid through said tube, said light beam producing means, said photo-electric cell means, and said resetting means, said control mechanism including a manual starting switch and means for automatically maintaining said switch in closed position, means operable in response to the subsequent interruption of said second named light beam by said advancing fluid for releasing said maintaining means.

10. A flow meter as defined in claim 9, including an upright tank connected in parallel to said transparent tube, in which the fluid rises simultaneously with the fluid in the tube, said tank providing the major portion of the volume of the body of fluid the flow of which is measured.

11. In a flow meter, means defining a conduit, pervious to the passage therethrough of light, a pair of photo-electric cells spaced along said conduit, means for producing a corresponding pair of light beams adapted to be passed through said conduit and impinged upon said cells, said conduit being adapted to have a column of fluid advanced therethrough from an initial position wherein both light beams are uninterrupted to a first position wherein a first one of said light beams is interrupted and subsequently to a second position wherein the second one of said light beams is interrupted, time mechanism for indicating the period of time elapsing between the interruption of said first light beam and the interruption of said second light beam, means responsive to the interruption of said first light beam effective to start said time indicating mechanism and responsive to the subsequent interruption of said second light beam effective to stop the operation of said time indicating mechanism, means defining a flow control valve for controlling the flow of fluid to said conduit, means for resetting the time mechanism back to an initial starting position thereof, and control means effective to simultaneously cause the operation of said flow control valve for starting the flow of fluid to said conduit, to effect the operation of said light beam producing means, and to effect the operation of said resetting means for moving said timing mechanism back to said initial starting position.

ROY G. SALISBURY.